United States Patent
Wang

(10) Patent No.: US 9,799,467 B1
(45) Date of Patent: Oct. 24, 2017

(54) KEY STRUCTURE

(71) Applicant: PRIMAX ELECTRONICS LTD., Taipei (TW)

(72) Inventor: Yi-Chen Wang, Taipei (TW)

(73) Assignee: PRIMAX ELECTRONICS LTD., Taipei (TW)

( * ) Notice: Subject to any disclaimer, the term of this patent is extended or adjusted under 35 U.S.C. 154(b) by 0 days.

(21) Appl. No.: 15/200,451

(22) Filed: Jul. 1, 2016

(30) Foreign Application Priority Data

May 23, 2016 (TW) .............................. 105115974 A

(51) Int. Cl.
*H01H 13/70* (2006.01)
*H01H 13/705* (2006.01)

(52) U.S. Cl.
CPC ..... *H01H 13/705* (2013.01); *H01H 2221/002* (2013.01); *H01H 2221/058* (2013.01); *H01H 2231/002* (2013.01)

(58) Field of Classification Search
CPC ........... H01H 13/705; H01H 2221/002; H01H 2221/058; H01H 2231/002; H01H 3/00; H01H 3/02; H01H 3/12; H01H 13/00; H01H 13/26; H01H 13/20; H01H 13/50; H01H 13/70; H01H 2003/00; H01H 13/12

USPC .......... 200/344, 314, 5 R, 5 A, 46, 510–514, 200/520, 521, 308, 310, 311, 312, 313, 200/318.1, 337, 341, 343, 345
See application file for complete search history.

(56) References Cited

U.S. PATENT DOCUMENTS

2001/0002647 A1* 6/2001 Hayashi ................. H01H 3/125
 200/344

* cited by examiner

*Primary Examiner* — Anthony R. Jimenez
(74) *Attorney, Agent, or Firm* — Kirton McConkie; Evan R. Witt

(57) ABSTRACT

A key structure includes a supporting plate, a keycap, a frame and a movable plate. The supporting plate is disposed over the movable plate. The keycap is disposed over the supporting plate. The frame is disposed over the supporting plate and arranged around the keycap. The frame includes a linking element. The linking element is inserted in a groove of the movable plate. While the movable plate is moved, the linking element is moved along the groove in response to the movement of the movable plate and the frame is ascended to a position at the same level with the keycap. Consequently, the top surface of the frame and the top surface of the keycap are collaboratively defined as a flat surface.

9 Claims, 10 Drawing Sheets

KEY STRUCTURE

FIELD OF THE INVENTION

The present invention relates to a key structure, and more particularly to a key structure having a function of avoiding erroneous operations.

BACKGROUND OF THE INVENTION

Generally, the widely-used peripheral input device of a computer system includes for example a mouse, a keyboard, a trackball, or the like. Via the keyboard, characters or symbols can be directly inputted into the computer system. As a consequence, most users and most manufacturers of input devices pay much attention to the development of keyboards. As known, a keyboard with scissors-type connecting elements is one of the widely-used keyboards.

FIG. 1 is a schematic perspective view illustrating the structure of a conventional notebook computer. As shown in FIG. 1, the conventional notebook computer 1 comprises a keyboard base 10, a top cover 11, a rotary shaft 12 and a keyboard 13. The top cover 11 comprises a display screen 111. The top cover 11 is rotatable through the rotary shaft 12. Consequently, the top cover 11 is closed to cover the keyboard base 10, or the top cover 11 is uplifted to allow the notebook computer 1 to be in a usage status. The keyboard 13 is installed on the keyboard base 10. When the keyboard 13 is operated by the user, a corresponding key signal is generated. Meanwhile, the notebook computer 1 is in a laptop mode.

The key structure of the keyboard 13 will be illustrated as follows. For succinctness, only one key structure is shown. FIG. 2 is a schematic side cross-sectional view illustrating a key structure of a conventional keyboard. As shown in FIG. 2, the conventional key structure 130 of the keyboard 13 comprises a keycap 1301, a scissors-type connecting element 1302, a rubbery elastomer 1303, a membrane switch circuit member 1304 and a base plate 1305. The keycap 1301, the scissors-type connecting element 1302, the rubbery elastomer 1303 and the membrane switch circuit member 1304 are supported by the base plate 1305. The scissors-type connecting element 1302 is used for connecting the base plate 1305 and the keycap 1301.

The scissors-type connecting element 1302 is arranged between the base plate 1305 and the keycap 1301, and the base plate 1305 and the keycap 1301 are connected with each other through the scissors-type connecting element 1302. The rubbery elastomer 1303 is enclosed by the scissors-type connecting element 1302. The membrane switch circuit member 1304 comprises plural key intersections (not shown). When one of the plural key intersections is triggered, a corresponding key signal is generated.

The rubbery elastomer 1303 is disposed on the membrane switch circuit member 1304. Each rubbery elastomer 1303 is aligned with a corresponding key intersection. When the rubbery elastomer 1303 is depressed, the rubbery elastomer 1303 is subjected to deformation to push the corresponding key intersection of the membrane switch circuit member 1304. Consequently, the corresponding key signal is generated.

The operations of the conventional key structure 130 in response to the depressing action of the user will be illustrated as follows. Please refer to FIG. 2 again. While the keycap 1301 is depressed, the keycap 1301 is moved downwardly to push the scissors-type connecting element 1302 in response to the depressing force. As the keycap 1301 is moved downwardly relative to the base plate 1305, the keycap 1301 pushes the corresponding rubbery elastomer 1303. At the same time, the rubbery elastomer 1303 is subjected to deformation to push the membrane switch circuit member 1304 and trigger the corresponding key intersection of the membrane switch circuit member 1304. Consequently, the membrane switch circuit member 1304 generates a corresponding key signal. When the keycap 1301 is no longer depressed by the user, no external force is applied to the keycap 1301 and the rubbery elastomer 1303 is no longer pushed by the keycap 1301. In response to the elasticity of the rubbery elastomer 1303, the rubbery elastomer 1303 is restored to its original shape to provide an upward elastic restoring force. In response to the elastic restoring force, the keycap 1301 is returned to its original position where it is not depressed.

Recently, a touch device is introduced into the market. The touch device is operated by using the user's finger directly or using a touch pen. Since the touch device is easy to use, many users and many manufacturers pay much attention to the touch device. For example, the display screen 111 of the notebook computer 1 is a touch screen with a touch control function. Moreover, a notebook computer having an inversely foldable screen is introduced into the market. FIG. 3 is a schematic perspective view illustrating a conventional notebook computer having an inversely foldable screen, in which the notebook computer is in a tablet mode. After the top cover 11 of the notebook computer 1 is rotated in the direction toward a rear side of the keyboard base 10 through the rotary shaft 12, the top cover 11 is folded to be contacted with a rear surface of the keyboard base 10 and the display screen 111 is exposed. Meanwhile, the notebook computer 1 has the outer appearance of a touch device such as a tablet computer. Since the display screen 111 is a touch screen, the notebook computer 1 can be used as a touch device.

However, the keyboard 13 of the notebook computer 1 in the tablet mode is also exposed. Consequently, when the notebook computer 1 is held by the user's hands, the fingers of the user may press the key structures 130. Since the pressed key structures 130 are moved downwardly to form a concave region, it is difficult for the user to stably hold the notebook computer 1. Moreover, if the key structure 130 is erroneously triggered when the notebook computer 1 is held by the user's hands, the notebook computer 1 also generates a key signal. Under this circumstance, the erroneous operation is generated. In other words, the conventional key structure for the notebook computer having an inversely foldable screen is not user-friendly.

Therefore, there is a need of providing a key structure capable of avoiding erroneous operations in response to the changed appearance.

SUMMARY OF THE INVENTION

The present invention provides a key structure having a function of avoiding erroneous operations.

In accordance with an aspect of the present invention, there is provided a key structure. The key structure includes a supporting plate, a keycap, a frame and a movable plate. The keycap is disposed over the supporting plate, and movable relative to the supporting plate in a first axial direction. The frame is disposed over the supporting plate and arranged around the keycap. The frame includes a linking element. The linking element is disposed on a bottom surface of the frame. The movable plate is disposed under the supporting plate. The movable plate is movable relative to the supporting plate in a second axial direction. The movable plate includes an extension part and a groove. The extension part is protruded upwardly from a top surface of the movable plate. The groove is formed in the extension part and corresponding to the linking element. The linking element is inserted in the groove, so that the frame and the movable plate are combined together. While the movable plate is moved in the second axial direction, the linking element is moved along the groove in response to movement of the movable plate, so that the frame is moved in the first axial direction.

From the above descriptions, the present invention provides a key structure. The key structure includes a movable plate, a keycap and a frame. The vertical movement of the frame is adjusted in response to the horizontal movement of the movable plate. Consequently, the function of the key structure is selectively enabled or disabled. According to the practical requirements, the frame is selectively moved to the position at the same level with the keycap. Moreover, by a stopping structure of the frame, the keycap is stopped from being descended. When the notebook computer is in the tablet mode, even if the key structure is carelessly touched, the problem of causing erroneous operation is avoided.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

For solving the drawbacks of the conventional technologies, the present invention provides a key structure having a function of avoiding erroneous operations.

Figure 4:
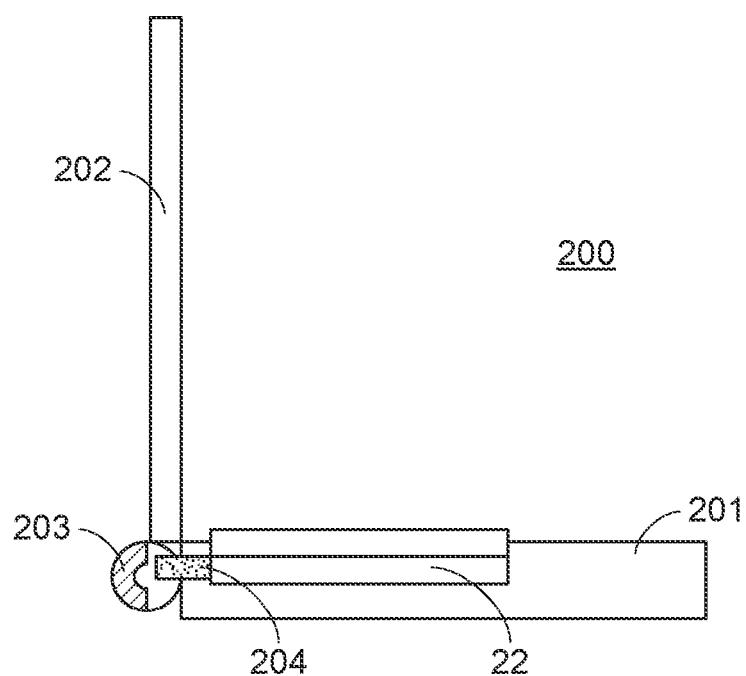
FIG. 4 is a schematic side cross-sectional view illustrating a notebook computer with key structures according to a first embodiment of the present invention.
Figure 5:
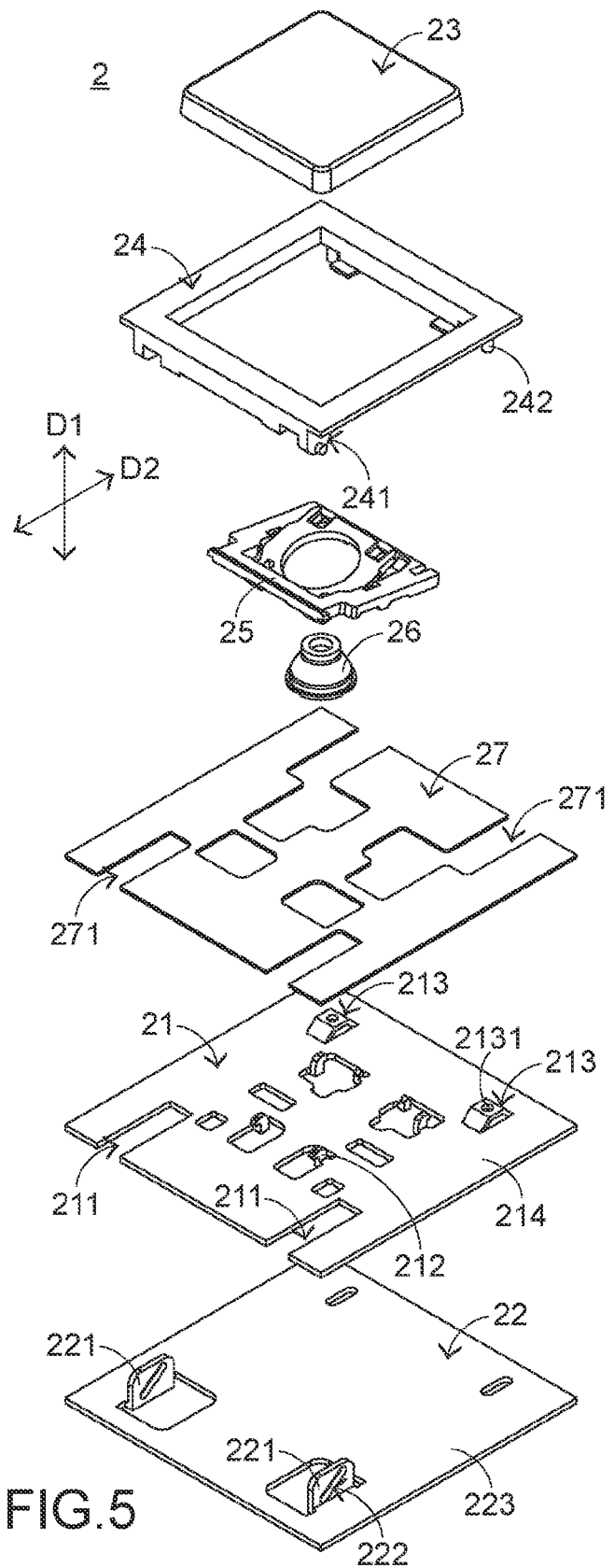
FIG. 5 is a schematic exploded view illustrating a key structure according to the first embodiment of the present invention.
Figure 6:
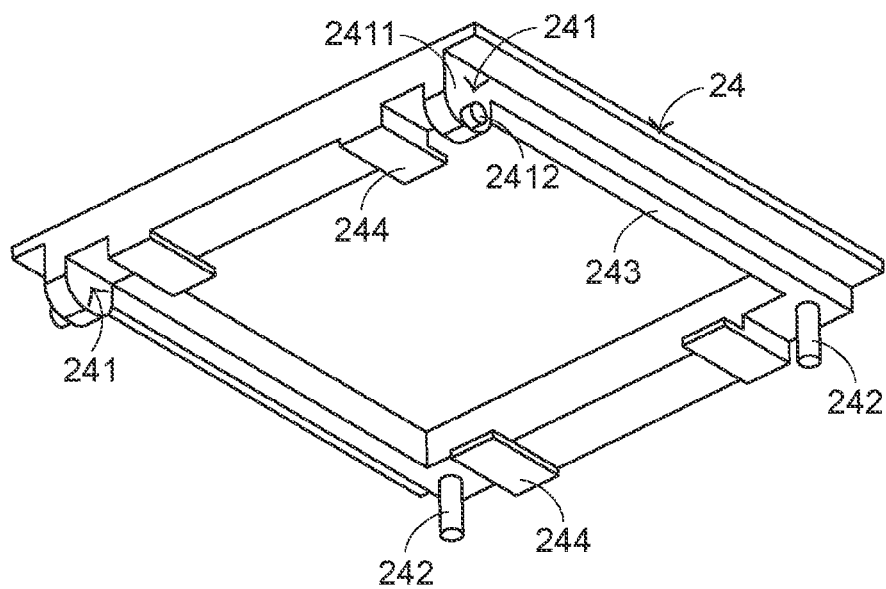
FIG. 6 is a schematic perspective view illustrating the frame of the key structure according to the first embodiment of the present invention.

Please refer to FIGS. 4, 5 and 6. FIG. 4 is a schematic side cross-sectional view illustrating a notebook computer with key structures according to a first embodiment of the present invention. FIG. 5 is a schematic exploded view illustrating a key structure according to the first embodiment of the present invention. FIG. 6 is a schematic side cross-sectional view illustrating the frame of the key structure according to the first embodiment of the present invention. All components of the key structure 2 can be seen in FIG. 5. In this embodiment, the key structure 2 comprises a supporting plate 21, a movable plate 22, a keycap 23, a frame 24, a scissors-type connecting element 25, an elastic element 26 and a membrane switch circuit member 27. The movable plate 22 of the key structure 2 is installed in a keyboard base 201 of a notebook computer 200. The keyboard base 201 is connected with a top cover 202. A rotary shaft 203 is connected with the top cover 202 and a transmission mechanism 204. The top cover 202 is rotatable relative to the keyboard base 201 through the rotary shaft 203. As the top cover 202 is rotated to different positions, the transmission mechanism 204 is enabled to allow the notebook computer 200 to be in different operation modes. For example, in case that the top cover 202 is closed to cover the keyboard base 201, the notebook computer 200 is in a hibernation mode or a power-off mode. Whereas, in case that the top cover 202 is uplifted to expose the key structures 2, the notebook computer 200 is in a laptop mode. When the top cover 202 is inversely folded to be contacted with a rear surface of the keyboard base 201, the notebook computer 200 is in a tablet mode.

Please refer to FIG. 5. The supporting plate 21 comprises plural supporting plate openings 211, plural supporting plate hooks 212 and plural position-limiting structures 213. The plural supporting plate hooks 212 and the plural position-limiting structures 213 are all protruded upwardly from a top surface 214 of the supporting plate 21. Each position-limiting structure 213 has a position-limiting hole 2131.

The movable plate 22 is disposed under the supporting plate 21 and partially penetrated through the supporting plate openings 211. The movable plate 22 is movable relative to the supporting plate 21 in a second axial direction D2 (e.g., a horizontal direction). In this embodiment, the movable plate 22 comprises plural extension parts 221 and plural grooves 222. The plural extension parts 221 are protruded upwardly from a top surface 223 of the movable plate 22. Moreover, each extension part 221 is aligned with a corresponding supporting plate opening 211. The plural extension parts 221 are penetrated through the corresponding supporting plate openings 211. Each groove 222 is formed in a corresponding extension part 221. In this embodiment, the plural supporting plate hooks 212 and the plural position-limiting structures 213 are integrally formed with the supporting plate 21, and the plural extension parts 221 are integrally formed with the movable plate 22.

The keycap 23 is disposed over the supporting plate 21. As the keycap 23 is depressed by the user, the keycap 23 is moved relative to the supporting plate 21 in a first axial direction D1 (e.g., a vertical direction). Moreover, the keycap 23 comprises plural keycap hooks 231.

The membrane switch circuit member 27 is disposed over the supporting plate 21. While the keycap 23 is moved downwardly to trigger the membrane switch circuit member 27, a key signal corresponding to the keycap 23 is generated. The membrane switch circuit member 27 comprises plural membrane openings 271 corresponding to the plural supporting plate openings 211. The plural extension parts 221 are penetrated through the corresponding supporting plate openings 211 and the corresponding membrane openings 271.

The elastic element 26 is arranged between the keycap 23 and the membrane switch circuit member 27. When the elastic element 26 is pushed by the keycap 24, the membrane switch circuit member 27 is triggered by the elastic element 26. Moreover, the elastic element 23 can provide an elastic force. In an embodiment, the elastic element 26 is a rubbery elastomer.

The scissors-type connecting element 25 is arranged between the keycap 23 and the membrane switch circuit member 27, and connected with the keycap 23 and the supporting plate 21. The scissors-type connecting element 25 is connected with the supporting plate 21 through the supporting plate hooks 212, and connected with the keycap 23 through the keycap hooks 231. Consequently, the scissors-type connecting element 25 is correspondingly moved with the keycap 23. In this embodiment, the keycap hooks 231 are integrally formed with the keycap 23.

Please refer to FIGS. 5 and 6. The frame 24 is disposed over the supporting plate 21 and arranged around the keycap 23. In this embodiment, the frame 24 comprises plural linking elements 241 and plural position-limiting posts 242. The plural linking elements 241 are disposed on a bottom surface 243 of the frame 24 and located at a first side of the frame 24. Each linking element 241 corresponds to one extension part 221 and one groove 222. Moreover, the plural linking elements 241 are inserted in the corresponding grooves 222. Consequently, the frame 24 is connected with the movable plate 22. Each linking element 241 comprises a connecting structure 2411 and a bulge 2412. The connecting structure 2411 is protruded downwardly from the bottom surface 243 of the frame 24, and located near the corresponding extension part 221. The bulge 2412 is disposed on the connecting structure 2411, and inserted in the corresponding groove 222. The bulge 2412 is movable along the corresponding groove 222. Moreover, the plural position-limiting posts 242 are disposed on the bottom surface 243 of the frame 24 and located at a second side of the frame 24. Each position-limiting post 242 is aligned with the corresponding position-limiting structure 213, and inserted in the corresponding position-limiting hole 2131.

The connecting structures 2411 are penetrated through the corresponding membrane openings 271 and the corresponding supporting plate openings 211 sequentially. The plural extension parts 221 are penetrated through the corresponding supporting plate openings 211 and the corresponding membrane openings 271 sequentially. Moreover, the bulges 2412 on the connecting structures 2411 are inserted in the corresponding grooves 222. Consequently, the movable plate 22 and the frame 24 are combined together. After the movable plate 22 and the frame 24 are combined together, the movable plate 22 can be moved in the second axial direction D2. While the movable plate 22 is moved in the second axial direction D2, the linking elements 241 are moved along the corresponding grooves 222 in response to the movement of the movable plate 22. Consequently, the frame 24 is moved in the first axial direction D1. Moreover, the uses of the plural position-limiting posts 242 and the plural position-limiting structures 213 can limit the movement of the frame 24 in the first axial direction D1. In this embodiment, the connecting structures 2411, the bulges 2412 and the position-limiting posts 242 are integrally formed with the frame 24.

In this embodiment, most of the above components are integrally formed. Preferably but not exclusively, these components are connected with each other through an appropriate connecting means. For example, the connecting structures, the bulges and the position-limiting posts are connected with the frame through an assembling means, an adhering means or an engaging means.

Figure 7:
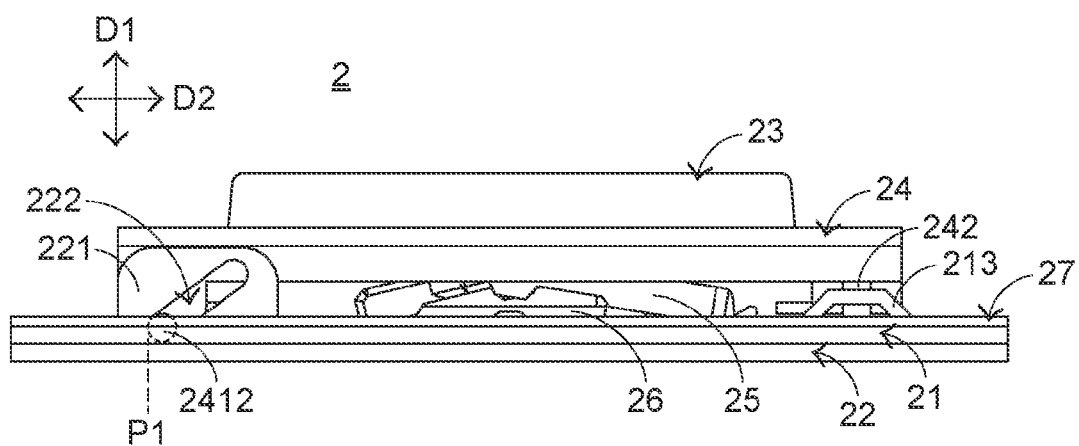
FIG. 7 is a schematic side view illustrating the key structure according to the first embodiment of the present invention, in which the key structure is in an enabled position.
Figure 8:
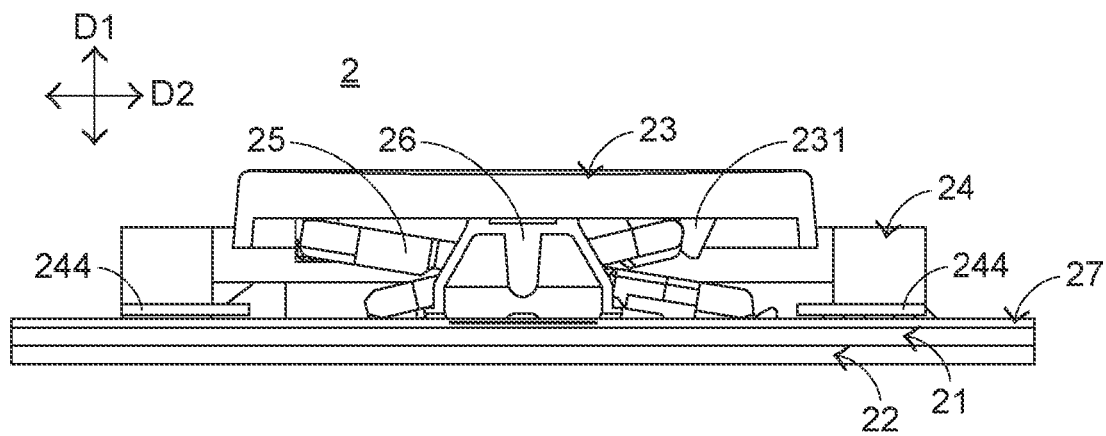
FIG. 8 is a schematic cross-sectional view illustrating the key structure of FIG. 7.

Hereinafter, the operations of the key structure 2 in response to the depressing action of the user will be illustrated with reference to FIGS. 7 and 8. FIG. 7 is a schematic side view illustrating the key structure according to the first embodiment of the present invention, in which the key structure is in an enabled position. FIG. 8 is a schematic cross-sectional view illustrating the key structure of FIG. 7. As shown in FIG. 7, the notebook computer is in a laptop mode, and the function of the key structure 2 is enabled. In this situation, each bulge 2412 is in an enabled position P1 of the corresponding groove 222, and the top surface of the frame 24 is at a level lower than the top surface of the keycap 23. In the laptop mode, the key 23 is allowed to be moved in the first axial direction D1. While the keycap 23 is depressed, the keycap 23 is moved in the first axial direction D1 in response to the depressing force and the scissors-type connecting element 25 is correspondingly swung. As the keycap 23 is moved downwardly to push the corresponding elastic element 26, the elastic element 26 is subjected to deformation to press the membrane switch circuit member 27 and trigger the corresponding key intersection (not shown) of the membrane switch circuit member 27. Consequently, the membrane switch circuit member 27 generates a corresponding key signal.

When the keycap 23 is no longer depressed by the user, no external force is applied to the keycap 23 and the elastic element 26 is no longer pushed by the keycap 23. In response to the elasticity of the elastic element 26, the elastic element 26 is restored to its original shape to provide an upward elastic restoring force to the keycap 23. As the keycap 23 is moved upwardly in the first axial direction D1, the scissors-type connecting element 25 is correspondingly swung. Consequently, the keycap 23 is returned to its original position where it is not depressed.

Figure 1:
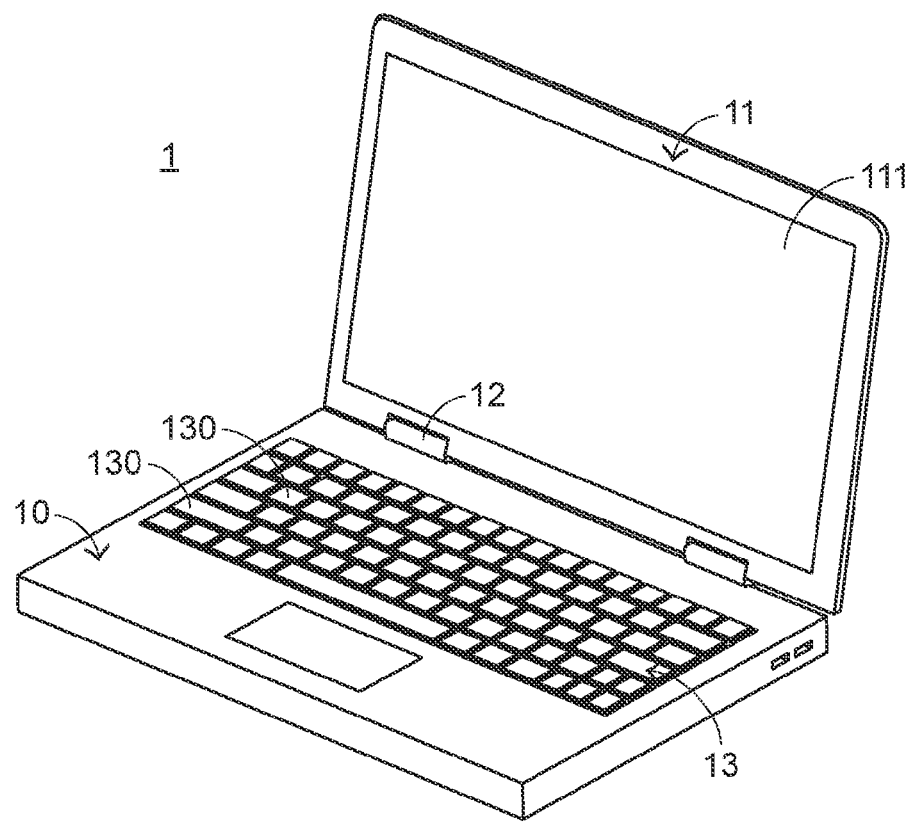
FIG. 1 is a schematic perspective view illustrating the structure of a conventional notebook computer.
Figure 2:
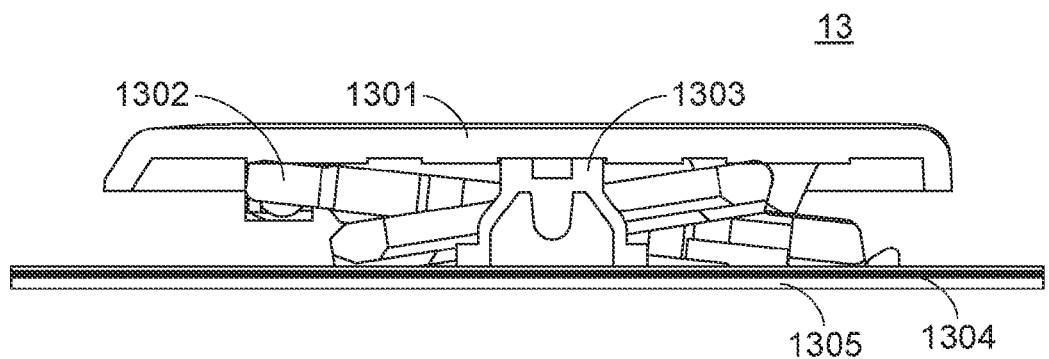
FIG. 2 is a schematic side cross-sectional view illustrating a key structure of a conventional keyboard.
Figure 3:
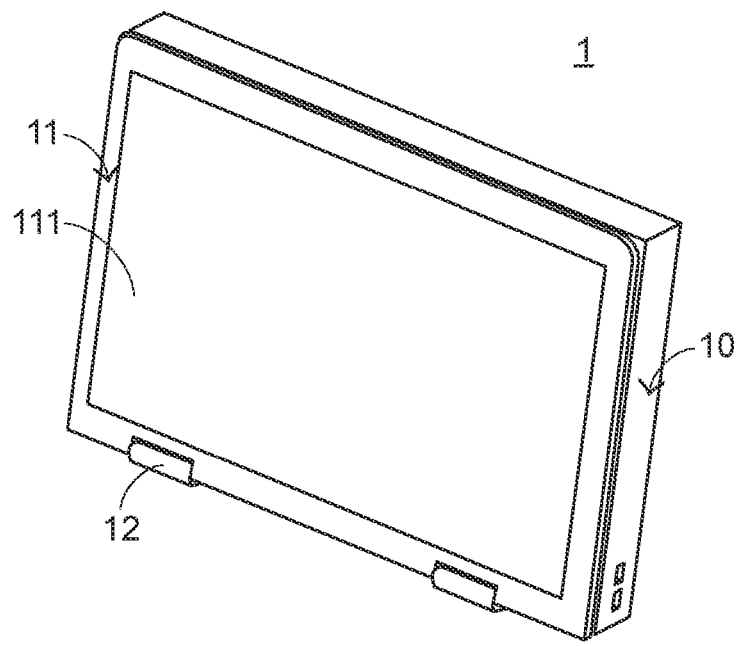
FIG. 3 is a schematic perspective view illustrating a conventional notebook computer having an inversely foldable screen, in which the notebook computer is in a tablet mode.
Figure 9:
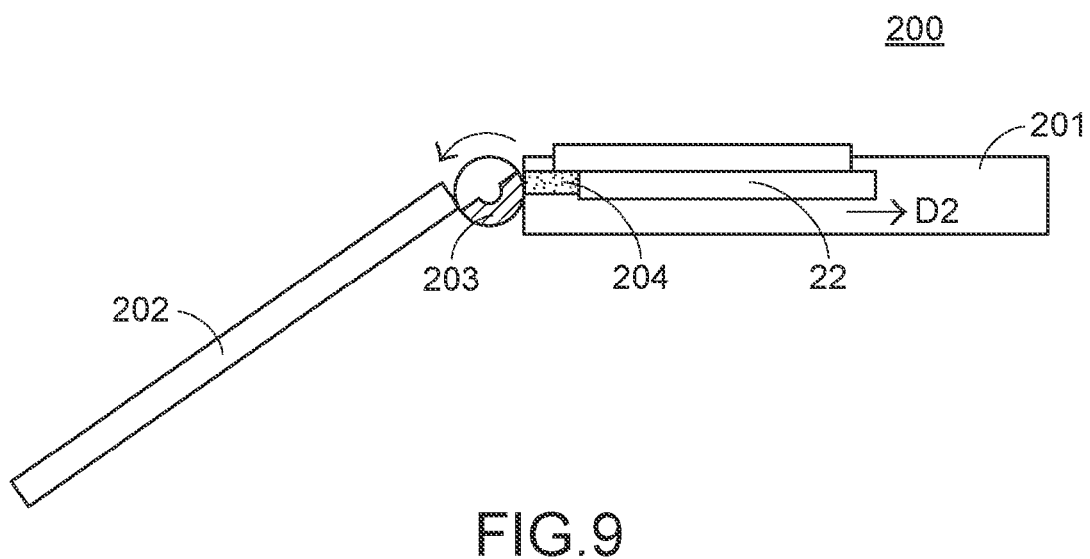
FIG. 9 is a schematic side cross-sectional view illustrating the notebook computer with the key structures according to the first embodiment of the present invention, in which the movable plate is moved in the second axial direction.
Figure 10:
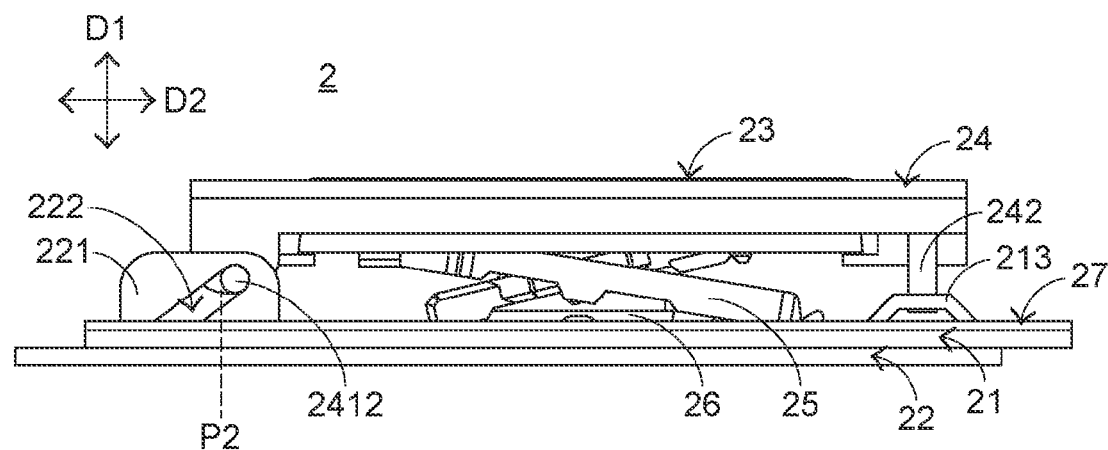
FIG. 10 is a schematic side view illustrating the key structure according to the first embodiment of the present invention, in which the frame is ascended.
Figure 11:
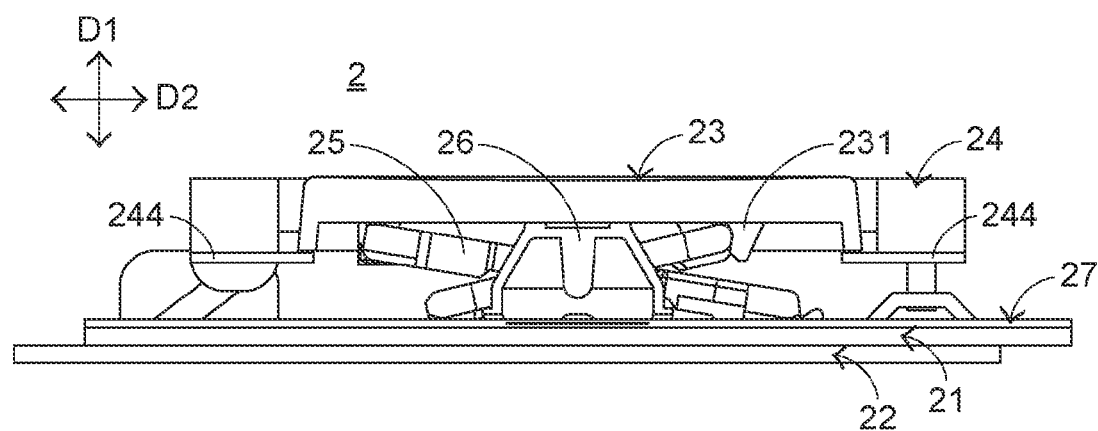
FIG. 11 is a schematic cross-sectional view illustrating the key structure of FIG. 10.

Hereinafter, a process of changing the appearance of the notebook computer 200 to switch the state of the key structure 2 will be illustrated with reference to FIG. 4 and FIGS. 6-11. FIG. 9 is a schematic side cross-sectional view illustrating the notebook computer with the key structures according to the first embodiment of the present invention, in which the movable plate is moved in the second axial direction. FIG. 10 is a schematic side view illustrating the key structure according to the first embodiment of the present invention, in which the frame is ascended. FIG. 11 is a schematic cross-sectional view illustrating the key structure of FIG. 10. As shown in FIG. 4, the transmission mechanism 204 is connected with the movable plate 22. For switching the operation mode of the notebook computer 200 from the laptop mode to the tablet mode (see FIG. 3), the top cover 202 is folded in a counterclockwise direction to allow the top cover 202 to be contacted with the rear surface of the keyboard base 201. While the top cover 202 is folded in the counterclockwise direction, the rotary shaft 203 is rotated to push the transmission mechanism 204 and thus the transmission mechanism 204 is moved in the second axial direction D2 to push the movable plate 22. Consequently, the movable plate 22 is moved relative to the supporting plate 21 in the second axial direction D2. While the movable plate 22 is moved in the second axial direction D2, the plural bulges 2412 are pushed by the corresponding extension parts 221 in response to the movement of the movable plate 22. Consequently, the plural bulges 2412 are moved to an upper position P2 along the corresponding grooves 222. As shown in FIG. 10, the frame 24 is moved in the direction D1 such that the top surface of the frame 24 is at the same level with the top surface of the keycap 23.

Since top surface of the frame 24 and the top surface of the keycap 23 are at the same level and collaboratively defined as a flat surface, the notebook computer 200 in the tablet mode can be handheld by the user more conveniently. In another embodiment, the frame 24 further comprises plural stopping structures 244. The stopping structures 244 are formed on the bottom surface 243 of the frame 24 and extended toward the inner side of the frame 24. When the frame 24 is moved to the position at the same level with the keycap 23, the plural stopping structures 244 are contacted with the lower portion of the keycap 23 (see FIG. 11). Under this circumstance, the keycap 23 is stopped from being moved in the first axial direction D1. That is, in the tablet mode of the notebook computer 200, the keycap 23 is stopped by the plural stopping structures 244 and unable to be moved downwardly. Even if the keycap 23 is depressed by the user at this moment, the keycap 23 is not moved downwardly. As a consequence, the problem of causing erroneous operation is avoided.

For switching the operation mode of the notebook computer 200 from the tablet mode to the laptop mode, the rotary shaft 203 is rotated to push the transmission mechanism 204. Consequently, the transmission mechanism 204 is moved in a direction opposed to the above direction to push the movable plate 22, and the movable plate 22 is moved relative to the supporting plate 21 in the second axial direction D2. While the movable plate 22 is moved in the second axial direction D2, the plural bulges 2412 are pushed by the corresponding extension parts 221 in response to the movement of the movable plate 22. Consequently, the plural bulges 2412 are moved to the enabled position P1 along the corresponding grooves 222, and the frame 24 is moved to the position lower than the keycap 23 in the first axial direction D1. Meanwhile, the function of the key structure 2 is enabled again (see FIG. 7).

In the above embodiment, the elastic element 26 is a component of the key structure 2 for returning the keycap 23 in the vertical direction. It is noted that the component for returning the keycap 23 in the vertical direction is not restricted. For example, in another embodiment, the key structure further comprises two magnetic elements. One of the magnetic elements is installed on the keycap, and the other magnetic element is installed on the supporting plate or the membrane switch circuit member. While the keycap is depressed, the two magnetic elements interact with each other to generate a repulsive force. In response to the repulsive force, the keycap is moved upwardly and returned to its original position. However, in this case, a protrusion structure is formed on an inner surface of the keycap to trigger the membrane switch circuit member.

Figure 12:
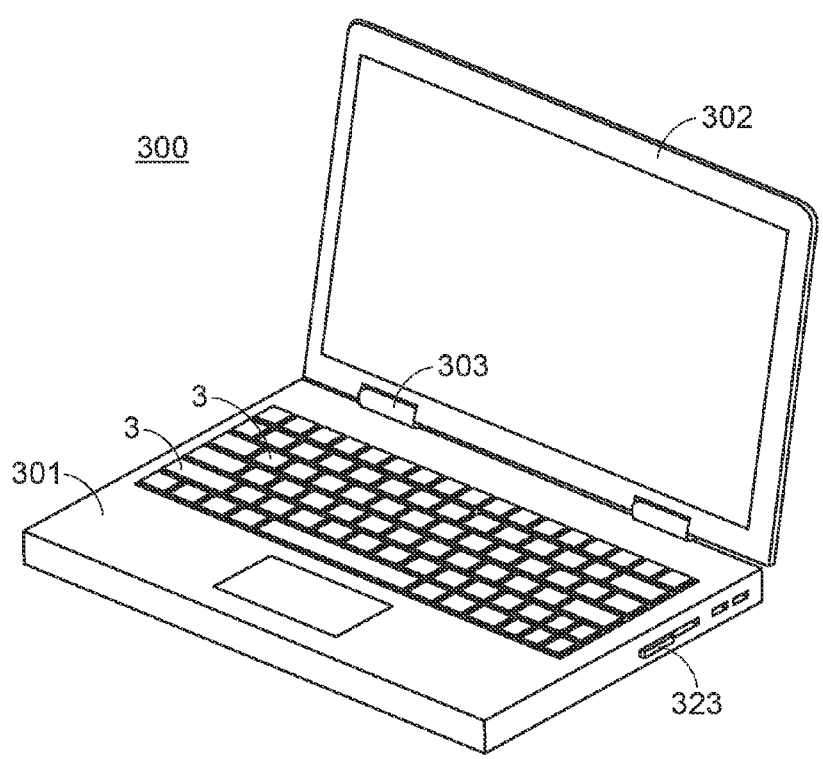
FIG. 12 is a schematic perspective view illustrating a notebook computer with key structures according to a second embodiment of the present invention.
Figure 13:
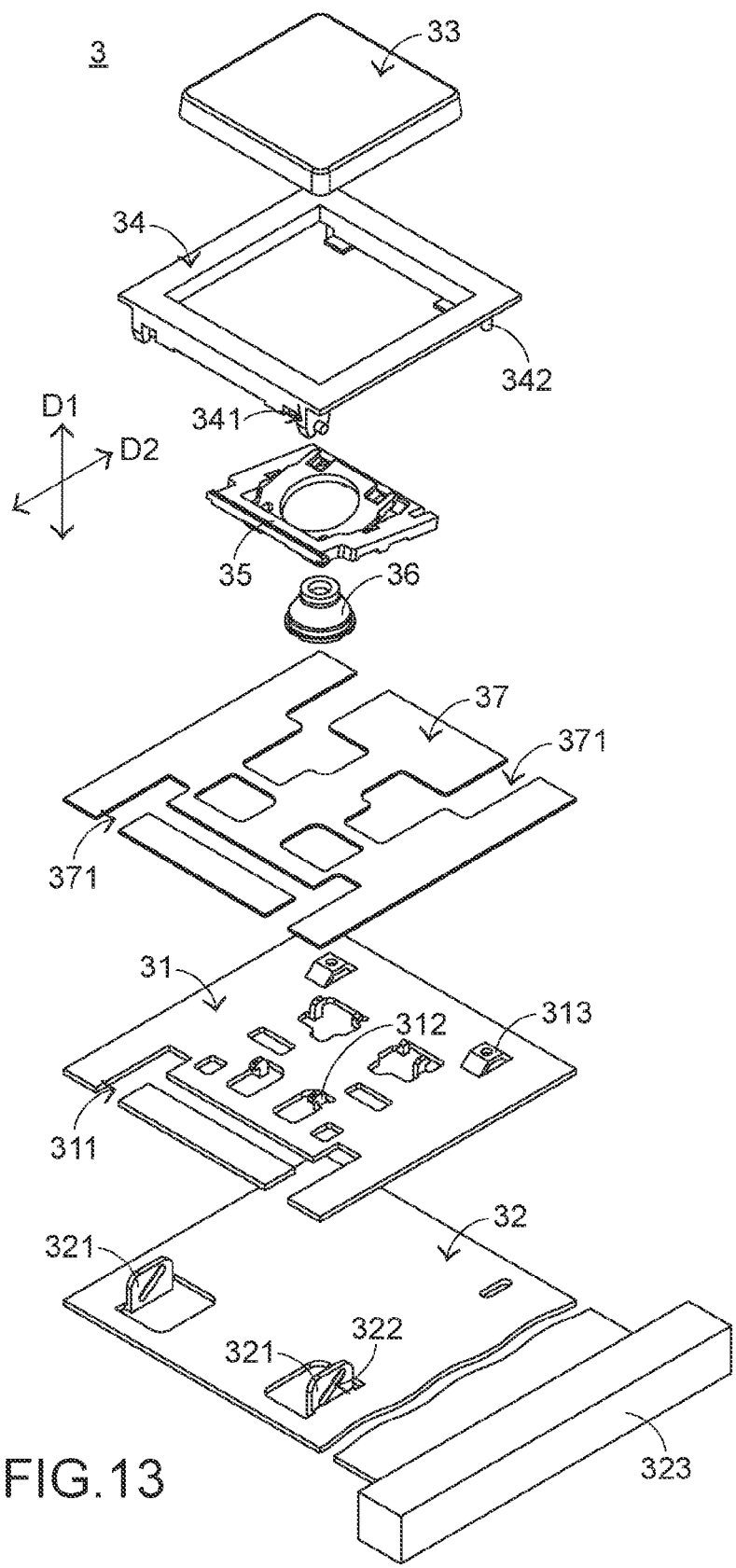
FIG. 13 is a schematic exploded view illustrating a key structure according to the second embodiment of the present invention.

The present invention further provides a second embodiment, which is distinguished from the first embodiment. Please refer to FIGS. 12 and 13. FIG. 12 is a schematic perspective view illustrating a notebook computer with key structures according to a second embodiment of the present invention. FIG. 13 is a schematic exploded view illustrating a key structure according to the second embodiment of the present invention. All components of the key structure 3 can be seen in FIG. 13. In this embodiment, the key structure 3 comprises a supporting plate 31, a movable plate 32, a keycap 33, a frame 34, a scissors-type connecting element 35, an elastic element 36 and a membrane switch circuit member 37. The supporting plate 31 comprises plural supporting plate openings 311, plural supporting plate hooks 312 and plural position-limiting structures 313. The movable plate 32 comprises plural extension parts 321 and plural grooves 322. The membrane switch circuit member 37 comprises plural membrane openings 371. The movable plate 32 of the key structure 3 is installed in a keyboard base 301 of a notebook computer 300. The keyboard base 301 is connected with a top cover 302. A rotary shaft 303 is connected with the top cover 302. As the top cover 302 is rotated relative to the keyboard base 301, the notebook computer 300 is in different operation modes. The structures and functions of the components of the key structure 3 which are identical to those of the first embodiment are not redundantly described herein. In comparison with the first embodiment, the key structure 3 of this embodiment has two distinguished aspects. Firstly, the structure of the frame 34 is distinguished. Secondly, the structure of the movable plate 32 is distinguished.

Figure 14:
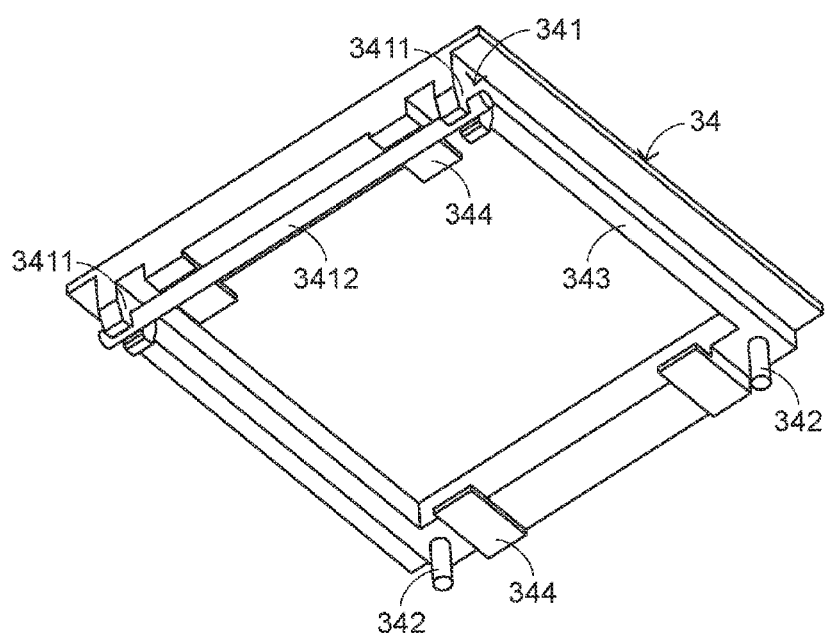
FIG. 14 is a schematic perspective illustrating the frame of the key structure according to the second embodiment of the present invention.

The structure of the frame 34 will be described as follows. FIG. 14 is a schematic perspective illustrating the frame of the key structure according to the second embodiment of the present invention. Please refer to FIGS. 13 and 14. In this embodiment, the frame 34 comprises plural linking elements 341, plural position-limiting posts 342 and plural stopping structures 344. In comparison with the first embodiment, the structures of the linking elements 341 are distinguished. The linking element 341 comprises plural connecting hooks 3411 and a fixing bar 3412. Each connecting hook 3411 is aligned with a corresponding extension part 321. The plural connecting hooks 3411 are protruded downwardly from a bottom surface 343 of the frame 34, and located near the corresponding extension parts 321. The fixing bar 3412 is detachably connected with the plural connecting hooks 3411 (e.g., two connecting hooks). The two ends of the fixing bar 3412 are inserted in the corresponding grooves 322 and movable along the corresponding grooves 322. Since the fixing bar 3412 is detachably connected with the corresponding connecting hooks 3411, the frame 34 and the movable plate 32 are combined with each other more easily through the fixing bar 3412 and the corresponding connecting hooks 3411.

The structure of the movable plate 32 will be described as follows. Please refer to FIGS. 12 and 13 again. As shown in FIG. 13, the movable plate 32 further comprises a driving part 322. The driving part 322 is located at a lateral side of the movable plate 32 and exposed outside the keyboard base 301 of the notebook computer 300. While the driving part 322 is pressed or pushed by the user, the movable plate 32 is correspondingly moved in the second axial direction D2. An example of the driving part 322 includes but is not limited to a driving lever or a push button. That is, the movement of the movable plate 32 is not linked with the rotary shaft 303.

Figure 15:
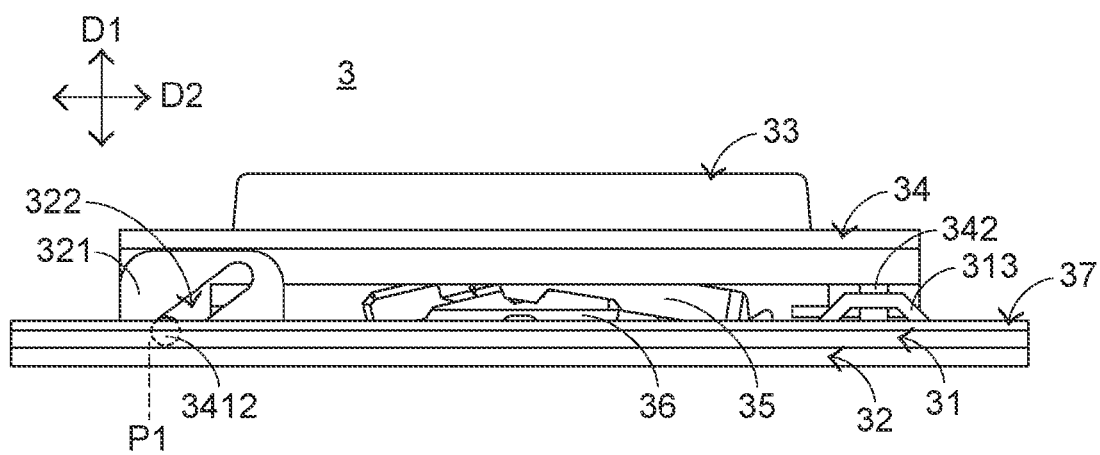
FIG. 15 is a schematic side view illustrating the key structure according to the second embodiment of the present invention, in which the key structure is in an enabled position.
Figure 16:
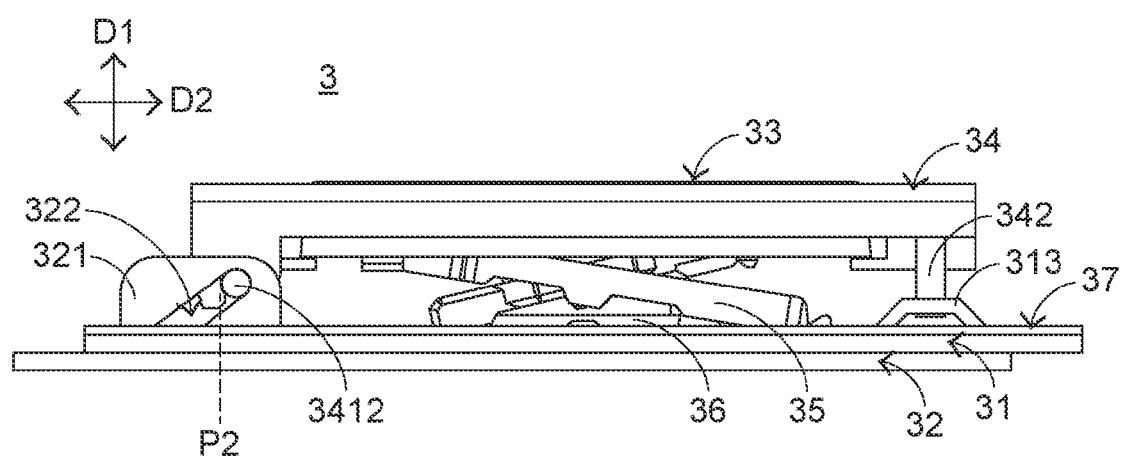
FIG. 16 is a schematic side view illustrating the key structure according to the first embodiment of the present invention, in which the frame is ascended.

Hereinafter, a process of changing the appearance of the notebook computer 300 to switch the state of the key structure 3 will be illustrated with reference to FIGS. 12-16. FIG. 15 is a schematic side view illustrating the key structure according to the second embodiment of the present invention, in which the key structure is in an enabled position. FIG. 16 is a schematic side view illustrating the key structure according to the first embodiment of the present invention, in which the frame is ascended. After the operation mode of the notebook computer 300 is switched to the tablet mode, the user may move the movable plate 32 relative to the supporting plate 31 in a second axial direction D2 through the driving part 322. While the movable plate 32 is moved in the second axial direction D2, the fixing bar 3412 is pushed by the corresponding extension parts 321 in response to the movement of the movable plate 32. Consequently, the two ends of the fixing bar 3412 are moved to an upper position P2 along the corresponding grooves 322. As shown in FIG. 16, the frame 34 is moved in the direction D1 such that the top surface of the frame 34 is at the same level with the top surface of the keycap 33.

For switching the operation mode of the notebook computer 300 from the tablet mode to the laptop mode, the driving part 322 is pressed or pushed by the user again. Consequently, the movable plate 32 is pushed in a reverse direction, and the movable plate 32 is moved relative to the supporting plate 31 in the second axial direction D2. While the movable plate 32 is moved in the second axial direction D2, the fixing bar 3412 is pushed by the corresponding extension parts 321 in response to the movement of the movable plate 32. Consequently, the two ends of the fixing bar 3412 are moved to the enabled position P1 along the corresponding grooves 322, and the frame 34 is moved to the position lower than the keycap 33 in the first axial direction D1. Meanwhile, the function of the key structure 3 is enabled again (see FIG. 15).

From the above descriptions, the present invention provides a key structure. The key structure includes a movable plate, a keycap and a frame. The vertical movement of the frame is adjusted in response to the horizontal movement of the movable plate. Consequently, the function of the key structure is selectively enabled or disabled. According to the practical requirements, the frame is selectively moved to the position at the same level with the keycap. Moreover, by a stopping structure of the frame, the keycap is stopped from being descended. When the notebook computer is in the tablet mode, even if the key structure is carelessly touched, the problem of causing erroneous operation is avoided.

It is noted that numerous modifications and alterations may be made while retaining the teachings of the invention. For example, when the notebook computer is in the tablet mode, the function of the membrane switch circuit member is disabled through the execution of an application program. Since the membrane switch circuit member is not triggered by any object, the problem of causing erroneous operation is avoided. In comparison with the conventional technologies, the key structure of the present invention has simpler structure and is easily operated. Consequently, the key structure of the present invention can solve the drawbacks of the conventional technologies.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A key structure, comprising:
    a supporting plate;
    a keycap disposed over the supporting plate, and movable relative to the supporting plate in a first axial direction;
    a frame disposed over the supporting plate and arranged around the keycap, wherein the frame comprises a linking element, and the linking element is disposed on a bottom surface of the frame; and
    a movable plate disposed under the supporting plate and movable relative to the supporting plate in a second axial direction, wherein the movable plate comprises:
    an extension part protruded upwardly from a top surface of the movable plate; and
    a groove formed in the extension part and corresponding to the linking element, wherein the linking element is inserted in the groove, so that the frame and the movable plate are combined together,
    wherein while the movable plate is moved in the second axial direction, the linking element is moved along the groove in response to movement of the movable plate, so that the frame is moved in the first axial direction, wherein the movable plate further comprises:
    a second extension part protruded upwardly from the top surface of the movable plate; and
    a second groove formed in the second extension part and corresponding to the linking element, wherein the linking element is inserted in the second groove, so that the frame and the movable plate are combined together.

2. The key structure according to claim 1, wherein the supporting plate further comprises a supporting plate opening corresponding to the extension part, wherein the extension part of the movable plate is partially penetrated through the supporting plate opening and connected with the linking element.

3. The key structure according to claim 1, wherein the supporting plate further comprises a position-limiting structure with a position-limiting hole, and the position-limiting structure is protruded upwardly from a top surface of the supporting plate, wherein the frame further comprises a position-limiting post corresponding to the position-limiting structure, and the position-limiting post is inserted in the position-limiting hole to limit movement of the frame in the first axial direction.

4. The key structure according to claim 1, further comprising:
    a membrane switch circuit member disposed over the supporting plate, wherein as the keycap is moved, a key signal corresponding to the keycap is generated by the membrane switch circuit member;
    a scissors-type connecting element connected with the keycap and the supporting plate, wherein the keycap is fixed on the supporting plate through the scissors-type connecting element; and
    an elastic element arranged between the keycap and the membrane switch circuit member, wherein when the elastic element is pushed by the keycap, the membrane switch circuit member is triggered by the elastic element, wherein when the keycap is no longer depressed, the elastic element provides an elastic force to the keycap, the keycap is moved in response to the elastic force, and the scissors-type connecting element is correspondingly swung.

5. The key structure according to claim 1, wherein the linking element comprises:
   a connecting structure protruded downwardly from the bottom surface of the frame and located near the extension part; and
   a bulge disposed on the connecting structure, inserted in the groove, and movable along the groove.

6. The key structure according to claim 5, wherein the connecting structure and the bulge are integrally formed with the frame.

7. The key structure according to claim 5, wherein while the movable plate is moved in the second axial direction and the bulge is moved to an upper position along the groove, the frame is moved in the first axial direction to a position at a same level with the keycap, wherein while the movable plate is moved in the second axial direction and the bulge is moved to an enabled position along the groove, the frame is moved to a position lower than the keycap.

8. The key structure according to claim 1, wherein the linking element comprises:
   plural connecting hooks protruded downwardly from the bottom surface of the frame, and located near the extension part and the second extension part; and
   a fixing bar coupled with the plural connecting hooks, wherein two ends of the fixing bar are respectively inserted in the groove and the second groove and movable along the groove and the second groove.

9. The key structure according to claim 8, wherein while the movable plate is moved in the second axial direction and the fixing bar is moved to an upper position along the groove, the frame is moved in the first axial direction to a position at a same level with the keycap, wherein while the movable plate is moved in the second axial direction and the fixing bar is moved to an enabled position along the groove, the frame is moved to a position lower than the keycap.

\* \* \* \* \*